United States Patent [19]

Newsteder

[11] Patent Number: 4,778,683
[45] Date of Patent: Oct. 18, 1988

[54] METHOD OF FORMING A MULTI-COLOR CHOCOLATE PRODUCT

[75] Inventor: Robert Newsteder, Utica, N.Y.
[73] Assignee: Chocolate Pix, Inc., Utica, N.Y.
[21] Appl. No.: 937,997
[22] Filed: Dec. 4, 1986
[51] Int. Cl.⁴ ............................................. A23G 3/12
[52] U.S. Cl. .................................... 426/249; 426/87; 426/104; 426/515; 426/302
[58] Field of Search ............... 426/249, 103, 104, 515, 426/302; 264/245, 313

[56] References Cited

U.S. PATENT DOCUMENTS

| | | | |
|---|---|---|---|
| 615,191 | 11/1898 | Lembke | 426/103 |
| 1,865,097 | 5/1931 | Gilham | 426/249 |
| 3,545,981 | 6/1967 | Klein et al. | 426/249 |
| 4,200,658 | 4/1980 | Katzman et al. | 426/515 |
| 4,369,200 | 1/1983 | Iwao et al. | 426/103 |
| 4,382,968 | 5/1983 | Akutagawa | 426/249 |
| 4,421,773 | 12/1983 | Akutagawa | 426/249 |

Primary Examiner—Steven Weinstein
Assistant Examiner—Mary S. Mims
Attorney, Agent, or Firm—Cobrin, Feingertz & Godsberg

[57] ABSTRACT

A method of forming a multi-color chocolate product, includes the steps of applying a first color chocolate into a chocolate mold having a planar upper surface and recesses formed therein which form a sharp angle at the junction of the recesses with the planar upper surface; squeegeeing the first color chocolate across the planar upper surface such that the first color chocolate fills the recesses and is scraped from the planar upper surface; permitting the first color chocolate to at least partially harden; applying a second color chocolate into the chocolate mold on the planar upper surface thereof; permitting the second color chocolate to harden to form the multi-color chocolate product; and removing the multi-color chocolate product from the chocolate mold.

2 Claims, 4 Drawing Sheets

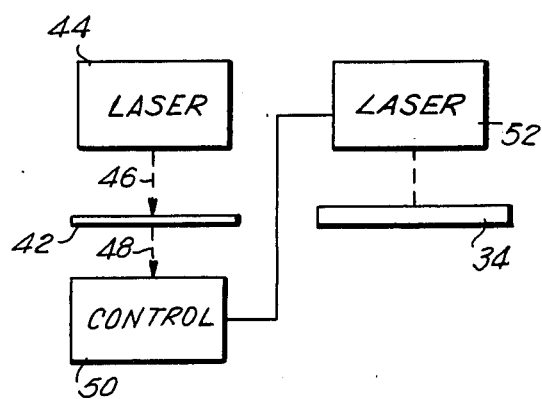
FIG. 10
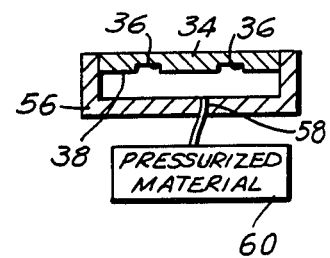
FIG. 11
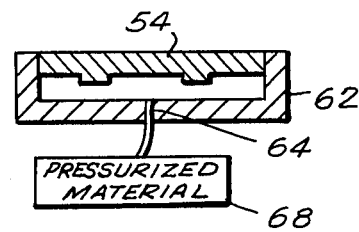
FIG. 11(a)
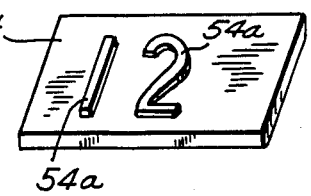
FIG. 12
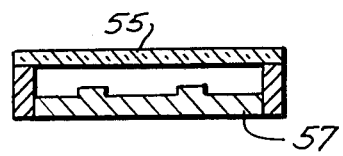
FIG. 13
FIG. 13(a)
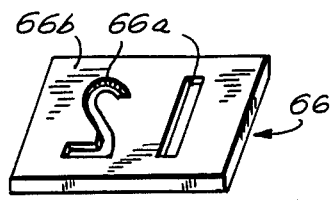
FIG. 14

FIG. 15
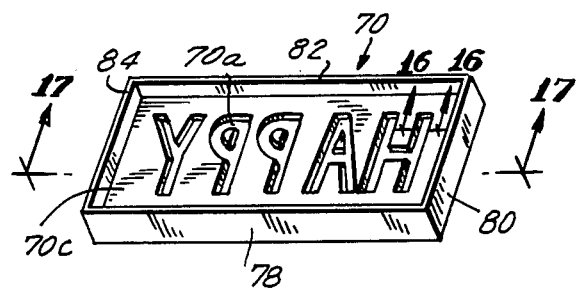
FIG. 16
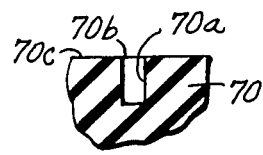
FIG. 17
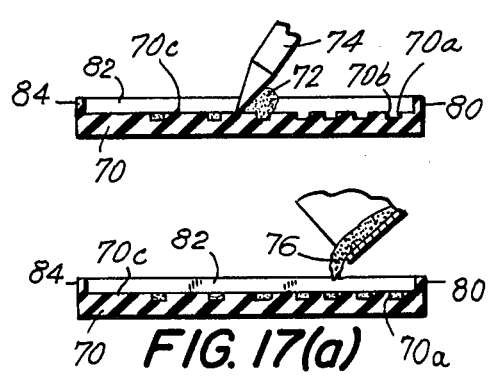
FIG. 18
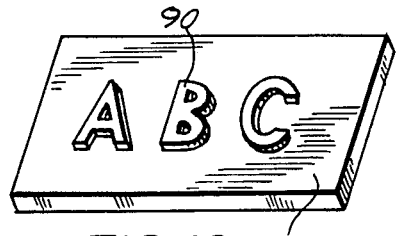
FIG. 19
FIG. 20
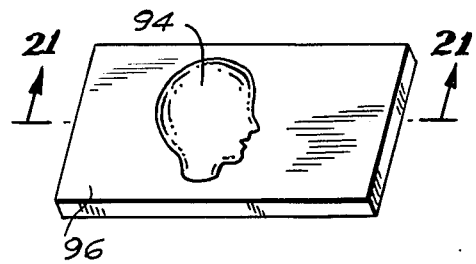
FIG. 21

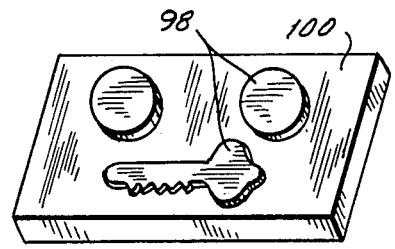
FIG. 22
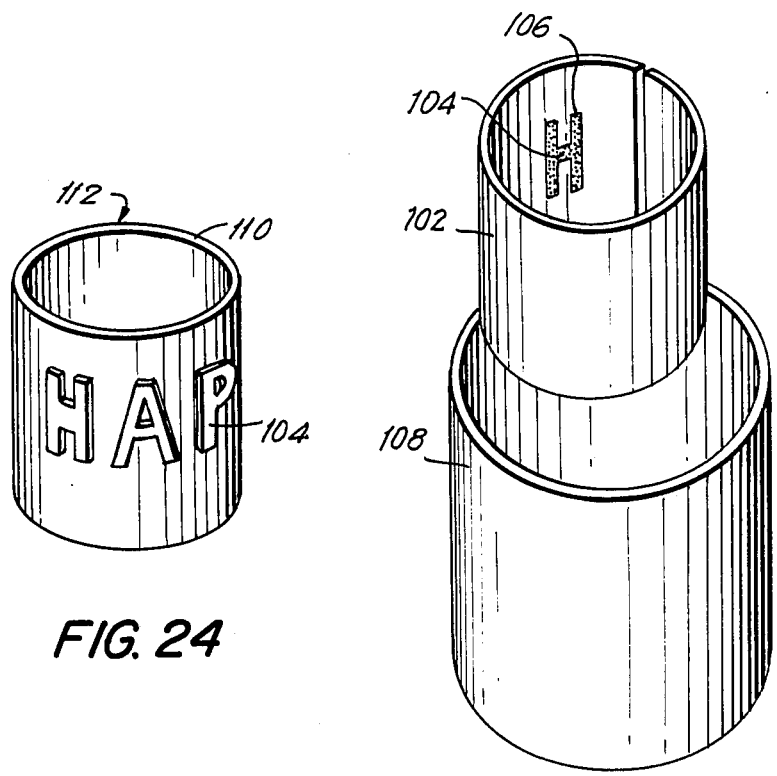
FIG. 23
FIG. 24

METHOD OF FORMING A MULTI-COLOR CHOCOLATE PRODUCT

BACKGROUND OF THE INVENTION

The present invention relates generally to producing multi-color chocolate products with fine definition.

The chocolate candy industry dates back two hundred years to the time in which cocoa or chocolate was first converted into a solid edible substance. Since that time, a wide variety of methods have been developed for casting the chocolate into blocks having different configurations. For the most part, however, these molding techniques have remained virtually unchanged.

Generally, female molds have been used in which the chocolate in liquid form is deposited and permitted to harden into the desired solid shape. These molds have been made from a wide range of materials, such as metal, wood, rubber, plastic-like compounds, and the like At the present time, the chocolate industry is generally limited to the reproduction of letters, such as the addition of the trademarks "Hershey's" or "Nestles" with a single chocolate color, which is in very broad detail. This is generally accomplished by casting the chocolate bar with the appropriate markings, or by using expensive molds which create very fine detail but are limited to one color, the expense of which can easily be accounted for in view of the mass production of such chocolate bars. Reference is also made to U.S. Pat. No. 4,200,658 which discloses a method of making a single color chocolate bar with a detailed design.

Recently, there has been a development of multi-color chocolate products. For example, a chocolate bar with the written message "Happy Birthday" has been produced, where the basic bar and the message are both made of chocolate, but of two different colors. This is the most difficult and costly type of chocolate to fabricate, and does not produce consistent results.

For making a two-color chocolate bar, it is known to use a negative mold having recesses for the message. This is accomplished by first "painting" in the recesses of the mold which, for example, spell "Happy Birthday", with chocolate of a first color. Then, after the first colored chocolate cools, chocolate having a second color is poured into the mold. The result is a two-color chocolate bar.

However, the letters which result are usually very broad stroked, that is, it is difficult to obtain very fine lettering. In addition, the edges between the letters and the background of the second color chocolate are usually blurry or non-descript. This latter disadvantage results, at least partially, from the fact that the molds that are used are inexpensive vacuum formed plastic molds, whereby the recesses in each mold are produced with rounded edges where they meet the planar surface of the mold. The reason for inexpensively vacuum forming such molds is because the multi-color chocolates produced thereby are not mass-produced, but rather, are intended only for few specialty uses at most, so that the cost of higher quality molds would not be offset by such minimal usage.

OBJECTS AND SUMMARY OF THE INVENTION

Accordingly, it is an object of the present invention to provide a method of producing a multi-color chocolate product with very fine detail in lettering and designs.

It is another object of the present invention to provide a method of producing a multi-color chocolate product having a sharp color separation between the different color chocolates.

It is still another object of the present invention to provide a method of mass producing a multi-color chocolate product, without requiring the use of skilled labor.

It is a further object of the present invention to provide a method of producing a multi-color chocolate product that is easy and economical to use.

In accordance with an aspect of the present invention, a method of forming a multi-color chocolate product, includes the steps of applying a first color chocolate into chocolate mold having a planar upper surface and recesses formed therein which form a sharp angle at the junction with the planar upper surface; squeegeeing the first color chocolate across the planar upper surface such that the first color chocolate fills the recesses and is scraped from the planar upper surface; permitting the first color chocolate to at least partially harden; applying a second color chocolate into the chocolate mold on the planar upper surface thereof; permitting the second color chocolate to harden to form the multi-color chocolate product from the chocolate mold.

In accordance with another aspect of the present invention, a method of forming a chocolate mold for use in forming a multi-color chocolate product, includes the steps of forming a first negative plate having an upper surface and recesses therein defining a pattern, such that the recesses form a sharp angle at the junction with the upper surface; forming a positive intermold from the first negative plate, and forming a negative chocolate mold from the positive intermold, with the chocolate mold having an upper surface and recesses therein defining the pattern, such that the recesses form a sharp angle at the junction with the upper surface.

In accordance with yet another aspect of the present invention, a method of forming a chocolate mold for use in forming a multi-color chocolate product, includes the steps of forming a positive plate having an upper surface and raised sections thereon defining a pattern, such that the raised sections form a sharp angle at the junction with the lower surface; and forming a negative chocolate mold from the positive plate, with the chocolate mold having an upper surface and recesses therein defining the pattern, such that the recesses form a sharp angle at the junction with the upper surface.

The above and other objects, features and advantages of the present invention will become readily apparent from the following detailed description which is to be read in connection with the accompanying drawings.

BRIEF DESCRIPTION OF THE DRAWINGS

FIG. 10 is a schematic, block diagram of a system for forming the first negative plate of FIG. 6 from the transparency of FIG. 8 or FIG. 9;

FIG. 11 is a cross-sectional view of molding apparatus used for forming a positive intermold from the first negative plate of FIG. 10, according to an embodiment of the present invention;

FIG. 11(a) is a cross-sectional view of an alternate embodiment of the present invention;

FIG. 12 is a perspective view of the intermold formed with the molding apparatus of FIG. 11 or FIG. 11(a);

FIG. 13 is a cross-sectional view of molding apparatus used for forming a negative chocolate mold from the intermold of FIG. 12, according to an embodiment of the present invention;

FIG. 13(a) is a cross-sectional view of a still further alternate embodiment of the present invention;

FIG. 14 is a perspective view of the negative chocolate mold formed with the molding apparatus of FIG. 13;

FIG. 15 is a perspective view of another chocolate mold formed according to the present invention;

FIG. 16 is a cross-sectional view of a portion of the chocolate mold of FIG. 15, taken along line 16—16 thereof;

FIG. 17 is a cross-sectional view of a portion of the chocolate mold of FIG. 15, taken along line 17—17 thereof, and showing the squeegee application of the first color chocolate thereon;

FIG. 17(a) shows how the mold looks as the second chocolate color is poured.

FIG. 18 is a perspective view of a chocolate bar formed by the present invention;

FIG. 19 is a perspective view of an embodiment of a positive plate according to the present invention;

FIG. 20 is a perspective view of another embodiment of a positive plate according to the present invention;

FIG. 21 is a cross-sectional view of the positive plate of FIG. 20, taken along line 21—21 thereof;

FIG. 22 is a perspective view of another embodiment of a positive plate according to the present invention;

FIG. 23 is a perspective view of a chocolate mold according to another embodiment of the present invention; and FIG. 24 is a perspective view of a chocolate cylinder formed by the present invention.

DETAILED DESCRIPTION OF THE PREFERRED EMBODIMENTS

Figure 1:
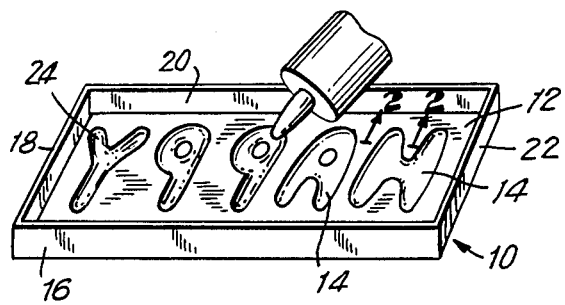
FIG. 1 is a perspective view of a mold used according to the prior art for forming a two-color chocolate bar.
Figure 2:
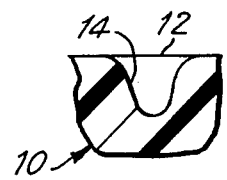
FIG. 2 is a cross-sectional view of a portion of the mold of FIG. 1, taken along line 2—2 thereof.

Referring to the drawings in detail, and initially to FIG. 1 thereof, there is shown therein a known mold 10 for forming a two-color chocolate bar. Mold 10 is formed with a flat planar surface 12 having recesses 14 therein which form the word "HAPPY". In addition, mold 10 includes side walls 16, 18, 20 and 22. Mold 10 is generally vacuum formed from an inexpensive plastic material, as is well known in the art. With conventional molds of this type, it is essentially impossible to create a sharp edge at the junction between planar surface 12 and recesses 14, as shown in FIG. 2.

Figure 3:
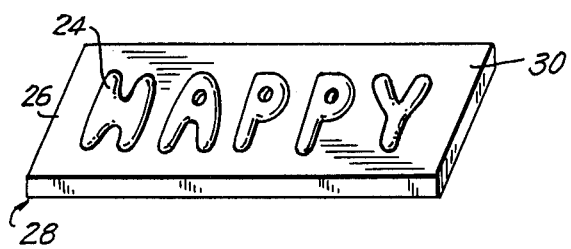
FIG. 3 is a perspective view of a chocolate bar formed with the mold of FIG. 1.
Figure 4:
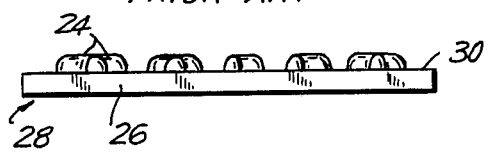
FIG. 4 is a side plan view of the chocolate bar of FIG. 3.

In order to form a two-color chocolate bar with mold 10, chocolate 24 of a first color is poured or painted into recesses 14 and permitted to harden. After chocolate 24 cools, chocolate 26 of a second color is poured into mold 10. The result is a two-color chocolate bar 28, shown in FIGS. 3 and 4. However, with this known method, the letters that are formed are generally very broad stroked, that is, it is impossible to obtain sharp, fine lettering that stands out from the main surface 30 of chocolate bar 28. Thus, the edges between the letters of the first chocolate 24 and the main surface 30 of the second chocolate 26, that is, the background, are blurry and non-descript.

It is also known to paint on letters of a different color chocolate onto a conventionally formed chocolate bar. However, the same problems result.

Figure 5:
FIG. 5 is a top plan view of a sheet of numbering used in forming a chocolate mold according to a first embodiment of the present invention.
Figure 6:
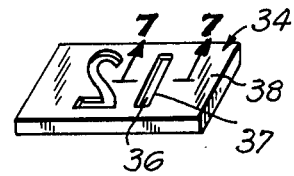
FIG. 6 is a perspective view of a first negative plate used to form a chocolate mold according to the first embodiment of the present invention.

Referring now to FIGS. 5-8, a method of producing a multi-color chocolate product according to a first embodiment of the invention first includes the step of obtaining the desired artwork, lettering, numbering or the like to be made into a mold. For illustration purposes only, a sheet of paper 32 containing the number "12" is shown in FIG. 5 as the desired numbering to be made into a mold. From this sheet, a negative plate 34 is formed, with the inverted number "12" being formed by recesses 36 therein, as shown in FIG. 6. It is an essential aspect of the present invention that the junction, as at 37, between the upper planar surface 38 of plate 34 and recesses 36 form a sharp and distinct angle, as shown by the cross-sectional view of FIG. 7. Preferably, the minimum width of recesses 36 should be 0.003 inches, and the depth can vary, although it is preferable that the depth be constant throughout.

Figure 8:
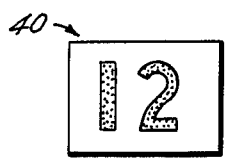
FIG. 8 is a top plan view of a first transparency produced with the sheet of FIG. 5.
Figure 9:
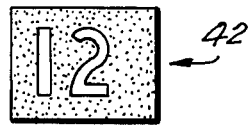
FIG. 9 is a top plan view of a second transparency produced with the sheet of FIG. 5.

Negative plate 34 can be formed by any known techniques. For example, number "12" on sheet 32 can be transferred to a transparency 40, as shown in FIG. 8 in which the number "12" is darkened and the background is transparent, or alternatively, to a transparency 42, as shown in FIG. 9 in which the number "12" is transparent and the background is darkened.

Then, any desired method can be used for forming negative plate 34. For example, transparency 40 can be employed in a process to expose a photoengraving plate that has been coated with a light-sensitive photoetch material. In such case, plate 34 is preferably made of magnesium or aluminum, both of which react predictably with known acids. Thus, transparency 40 is placed over the photosensitive coating and the coating is exposed through the transparency to ultraviolet light or light at a wavelength that will react with the coating to render it insoluble in the light-exposed regions. A latent image is thus recorded on the plate surface with the light regions being recorded as insoluble areas and the dark regions as soluble regions. The exposed plate 34 is washed with a suitable solvent to remove the coating in the soluble regions, thereby revealing the underlying metal.

The washed plate is then placed in an acid bath and the acid is allowed to attack the unprotected metal for a sufficient period of time to produce relatively deep recesses in the exposed region. The depth of the etch is considerably greater than that used in preparing a printing plate. When the etch has reached a desire depth, plate 34 is removed from the bath, the residual acid on the plate is neutralized with water, and plate 34 is dried.

As a result, plate 34 is formed, as shown in FIG. 6, with recesses 36 forming the number "12".

Alternatively, as shown in FIG. 10, a laser system can be used to form recesses 36 in plate 34. Specifically, as shown, a first scanning laser 44 scans transparency 42 with a light beam 46. The portions 48 of light beam 46 that pass through the transparent sections of transparency 42, are received by a control circuit 50 which, in response thereto, controls the movement and intensity of a second burning laser 52 which carves out areas on the surface 38 of plate 34 corresponding to the transparent regions of transparency 42. Other methods, such as mechanical engraving, photoengraving, hand engraving and the like can be used.

As another alternative, a film comprised of a base and an emulsion, is placed over a photosensitive element which, for example, is a photosensitive photopolymer. Examples of such a photopolymer are DuPont "Cyrel", UniRoyal "Flexlight", "TOK" made by Miraclon of Japan and Toyoba of Japan. In addition, BASF of Germany and Toray of Japan, respectively, each have a photopolymer which would be suitable. If desired, a liquid photopolymer could be used. The base of the photopolymer is pre-exposed to preharden the same, and a bonded metal strip is provided beneath the base, for support purposes.

With this arrangement, a source of ultraviolet light which is energized for a preselected amount of time, is located above the film, so that an image on the photopolymer will be formed which corresponds to the image found on the film. After the photopolymer has been exposed, the unexposed areas of the photopolymer are washed away with water, or suitable chemicals if a water washout is not used, with the exposed areas in raised peaks as shown, for example, in FIG. 6. Alternatively, high-intensity steam or brushes may be used to wash away the unexposed areas. The photopolymer photosensitive element will now have on it peaks and valleys which correspond to the image found in the film.

Figure 7:
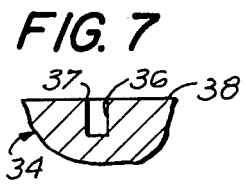
FIG. 7 is a cross-sectional view of a portion of the first negative plate of FIG. 6, taken along line 7—7 thereof.

As can be seen in FIGS. 6 and 7, the photopolymer will have relief-formed valleys which generally have straight sides, a flat bottom and are uniform. The advantage of this, of course, is that the image formed from the photopolymer element has a very high quality line art likeness. It is important to note that the tops of the peaks are formed in a common plane.

According to the first embodiment of the present invention, in order to form a negative mold made from a resilient material, it is necessary to first form a positive intermold 54 from negative metal plate 34. Thus, negative metal plate 34 is placed in a molding apparatus 56 having an injection port 58, and intermold 54 is formed by an injection molding process by supplying molding material under pressure from a source 60, as shown in FIG. 11. Preferably, the molding material is polysulfide rubber which forms a relatively soft, but stable, mold. However, intermold 54 could also be formed from other materials, such as RTV silicone, soft FDA approved vinyl or polyolefin. Accordingly, intermold 54 having raised sections 54a defining the number "12" is formed, as shown in FIG. 12.

Alternatively, the molding material can be poured in a mold 65 as shown in FIG. 11(a) wherein a backup plate 61 is utilized for support purposes.

After intermold 54 is formed, it is placed in another molding apparatus 62 having an injection port 64. Chocolate mold 66 is formed by an injection molding process by supplying molding material under pressure from a source 68, as shown in FIG. 13. Preferably, the molding material is silicone or a silicone type material, in order to form an elastic, resilient mold. The use of an elastic, resilient material is necessary in order to remove the chocolate formed therein. Accordingly, chocolate mold 66 having recesses 66a defining the number "12" is formed, as shown in FIG. 14, with there being a sharp definition at the junction between recesses 66a and the upper surface 66b of chocolate mold 66.

Alternatively, the chocolate mold can be formed by pouring as shown in FIG. 13(a) wherein the silicon is poured against a positive plate 57 of polysulfide rubber. The positive plate can also be injection molded. The formation of a positive plate is hereinafter discussed with there being a glass backup plate 55.

According to a second embodiment of the present invention, first negative plate 34 is eliminated, and instead, a first rigid positive plate is formed with raised sections defining the number "12", that is, similar in construction to intermold 54 of FIG. 12. This method, however, is only intended to be used when the image to be formed has broad surfaces, that is, this second embodiment cannot be used for fine lettering, which is only attainable with the first embodiment. Further, the positive plate cannot be formed by the etch process described above, and therefore the positive plate should preferably be formed with the photopolymer, or possibly by the laser method. The difference, however, would be that transparency 40 would be used, rather than transparency 42. Thus, in the laser method, the laser would cut the background out. The chocolate mold would then be formed in the same manner as discussed in the first embodiment.

Once the chocolate mold is formed, it can be used for forming a two-color chocolate bar as follows, which will be described with respect to the word "HAPPY", as shown by chocolate mold 70 in FIG. 15. As shown, chocolate mold 70 includes recesses 70a which spell the word "HAPPY". As has been described in detail hereinbefore, and as shown clearly in FIGS. 16 and 17, the junctions 70b between the upper planar surface 70c of mold 70 and recesses 70a thereof, are sharp and definite so that the letters formed in the final product can be fine and sharp.

In FIG. 17(a) one can readily see how the mold looks as the second color chocolate is being poured. As FIG. 17(a) shows, recesses 70a are filled as the second color chocolate is poured. All of the recesses of 70a have been filled and the second color chocolate is being poured on the top surface of mold 70.

Thus, the first color chocolate 72 is first placed on the upper planar surface 70c of mold 70. In accordance with an important aspect of the present invention, a squeegee 74 is used to spread the first color chocolate 72 across upper surface 70c so that chocolate 72 fills in recesses 70a. At the same time, squeegee 74 removes all chocolate from upper planar surface 70c so that there is a sharp distinction between first color chocolate 72 and the second color chocolate that is formed thereon at later time. It is noted that the use of a squeegee could not be used in this manner in the prior art of FIGS. 1-4. This is because the recesses 14 formed in mold 10 are not formed with sharp angles where they meet the upper surface 12 of mold 10. As a result, the chocolate would spread over upper surface 12, and the same problems of lack of definition between the two chocolates would occur.

After first chocolate 72 is permitted to cool, a second chocolate 76 is poured into mold 70, between side walls 78, 80, 82 and 84 thereof, and permitted to cool, whereupon the hardened chocolate bar 86, as shown in FIG. 18, is removed. As will be appreciated, the lettering 88 thereon is fine and sharp, and there is a sharp and clear distinction between the two chocolates on the plane of color separation.

It will be appreciated that other methods of forming the chocolate mold according to the present invention can be used that are compatible with the present invention, that is, in which the recesses of the mold are formed with sharp and definite corners where they meet the upper planar surface of the chocolate mold.

For example, a chocolate silicone mold can be formed initially by the above laser technique, that is, using the burning laser directly on the silicone chocolate mold to form the same. Alternatively, letters 90 having sharp corners could be glued onto a plastic sheet 92, as shown in FIG. 19. In this regard, plastic sheet 92 would serve as the positive plate from which the chocolate mold is formed, as described above.

The present invention, however, is not limited to letters and numbers, but rather, covers all designs. For example, as shown in FIGS. 20 and 21, a clay sculpture 94 on a plastic or glass substrate 96 could be used as the intermold. Alternatively, items 98 such as keys, coins and the like, as shown in FIG. 22, could be mounted on a glass or plastic substrate 100, and used as the positive plate.

In like manner, the present invention is not limited to forming a flat chocolate bar. For example, as shown in FIG. 23, if the chocolate mold 102 is sufficiently thin, the first color chocolate 104 could be squeegeed into the recesses 106 thereof, and then the mold 102 could be wrapped inside a rigid cylinder 108. The second chocolate 110 could then be poured into the cylinder to form a two-color chocolate cylinder 112, as shown in FIG. 24.

Having described specific preferred embodiments of the invention with reference to the accompanying drawings, it will be appreciated that the present invention is not limited to those precise embodiments, and that various changes and modifications can be effected therein by one of ordinary skill in the art without departing from the spirit or scope of the invention as defined in the appended claims.

What is claimed is:

1. A method of forming a multi-color chocolate product, comprising the steps of:
   depositing a first color chocolate into a silicone elastic resilient mold having a planar upper surface and recesses formed therein, such recesses forming a sharp and distinct angle at the junction with said planar upper surface;
   squeegeeing said first color chocolate across said planar upper surface of said mold to ensure that said first color chocolate fills said recesses and that said upper surface of said first color chocolate is co-planar with the upper surface of the mold to form sharp angles between an upper surface of said first color chocolate and sides thereof at a junction between said upper surface and said sides;
   permitting said first color chocolate to at least partially harden;
   applying a second color chocolate into said mold on said planar upper surface thereof;
   permitting said second color chocolate to harden to form said multi-color chocolate product; and
   removing said multi-color chocolate product from said mold by making use of the elastic resilient properties of the silicone mold to enable said sharp and distinct angles to be retained in said product and a clean and distinct color transition to be maintained at interfaces between said first and second color chocolate.

2. A method of forming a multi-color chocolate product comprising the steps of:
   depositing a first color chocolate into a silicone elastic resilient mold having a planar upper surface and recesses formed therein which form a sharp angle at the junction with said upper planar surface;
   squeegeeing said first color chocolate across said upper planar surface of said mold such that the first color chocolate fills said recesses and such that said upper surface of said first color chocolate is co-planar with the upper surface of the mold thereby forming sharp angles between an upper surface of said first color chocolate and sides thereof at a junction between said upper surface and said sides;
   rolling said filled mold into a defined configuration;
   placing said rolled up filled mold into a substantially rigid container with the filled recess facing outward and in contact with said container;
   permitting said first color chocolate to at least partially harden;
   applying a second color chocolate into said filled mold on said upper planar surface thereof;
   permitting said second color chocolate to harden to form said multi-color chocolate product; and
   removing said multi-color chocolate product from said mold.

* * * * *